United States Patent

Marincic et al.

[11] Patent Number: 5,514,492
[45] Date of Patent: May 7, 1996

[54] CATHODE MATERIAL FOR USE IN AN ELECTROCHEMICAL CELL AND METHOD FOR PREPARATION THEREOF

[75] Inventors: Nikola Marincic, Winchester; Luka Rabadjija, Newton, both of Mass.

[73] Assignee: Pacesetter, Inc., Sylmar, Calif.

[21] Appl. No.: 459,685

[22] Filed: Jun. 2, 1995

[51] Int. Cl.$^6$ .............................. H01M 4/62; H01M 6/00
[52] U.S. Cl. ............................ 429/194; 429/94; 429/217; 29/623.5
[58] Field of Search ................................ 429/209, 212, 429/217, 215, 216, 94, 194; 29/623.5, 623.1

[56] References Cited

U.S. PATENT DOCUMENTS

| | | | |
|---|---|---|---|
| 3,536,532 | 10/1970 | Watanabe et al. | 136/83 |
| 3,700,502 | 10/1972 | Watanabe et al. | 136/6 |
| 4,121,020 | 10/1978 | Epstein et al. | 429/162 |
| 4,268,587 | 5/1981 | Farrington et al. | 429/193 |
| 4,271,242 | 6/1981 | Toyoguchi et al. | 429/194 |
| 4,539,272 | 9/1985 | Goebel | 429/94 |
| 4,539,274 | 9/1985 | Goebel | 429/94 |
| 4,565,752 | 1/1986 | Goebel et al. | 429/94 |
| 4,565,753 | 1/1986 | Goebel et al. | 429/194 |
| 5,114,811 | 5/1992 | Ebel et al. | 429/194 |
| 5,147,737 | 9/1992 | Post et al. | 429/94 |

OTHER PUBLICATIONS

Schneider, A. A., et al., "Pacemaker Batteries—Past, Present and Future," Abstract. Date not available.
Fukuda, M., et al., "Lithium–Carbon Monofluoride Cells," *Lithium Batteries*, Chapter 9, pp. 211–239, Academic Press, New York (ed. J. P. Gabano). Date not available.
Morita, A. et al., "Method of Making Carbon Fluoride Positive Electrode," Kokai Patent Publication No. 74242–1978, (Jul. 1, 1978).
Ohishi, H., et al.,"Nonaqueous Electrolyte Battery," Kokai Patent Publication No. 103513–1979, (Aug. 15, 1979).
Yoshinor, T., et al., "A Method of Manufacturing Flurocarbon Electrodes," Kokai Patent Publication No. 1977–96319, (Aug. 12, 1977).
Matsushita (Release), New–type "High Energy Primary Battery," MEP–71–19, (Sep. 14, 1971).

*Primary Examiner*—Anthony Skapars
*Attorney, Agent, or Firm*—Lisa P. Weinberg; Harold C. Schloss

[57] ABSTRACT

A cathode material is fabricated using two binder compounds, polyethylene oxide and acrylic resin, which react during processing to achieve enhanced bonding. The cathode material is formed by dissolving acrylonitril resin within the acetonitrile solvent. Polyethylene oxide powder is added yielding a homogenous solution. A powder mix containing a carbon material, such as high surface area carbon powder, and an active cathode compound, such as polycarbon monoflouride, is added to the binder mixture to produce a slurry. In one embodiment, the slurry is heated to evaporate the solvents, yielding a thin flexible cathode material for mounting to an expanded screen current collector. In an alternative embodiment, the slurry is spread directly onto a foil current collector. The solvents thereafter evaporate from the slurry yielding excellent mechanical and electrical coupling between the active cathode compound and the current collector. The resulting cathode structure and a lithium anode structure are mounted to opposing sides of a polymeric separator for use within an electrochemical cell of an implantable medical device.

19 Claims, 2 Drawing Sheets

CATHODE MATERIAL FOR USE IN AN ELECTROCHEMICAL CELL AND METHOD FOR PREPARATION THEREOF

BACKGROUND OF THE INVENTION

1. Field of the Invention

The invention generally relates to electrochemical cells for use in powering implantable devices and in particular to improved binder materials for use in the formation of cathode electrode structures for use in such electrochemical cells.

2. Description of the Related Art

A wide range of implantable electronic devices are provided for surgical implantation into humans or animals. One common example is the cardiac pacemaker. Other examples of implantable devices include devices for stimulating or sensing portions of the brain, spinal cord, muscles, bones, nerves, glands or other body organs or tissues.

Implantable devices are becoming more and more complex and commonly include sophisticated data processing hardware such as microprocessors, memory devices, or other large scale integration (LSI) devices. Often, the devices are designed for transmitting signals to remote sensing devices. With the increase in the sophistication of implantable devices and in particular with the need to reliably transmit signals to sensors external to the body, the need for improved power cells for powering the implantable devices has increased greatly. There are, of course, limitations on the design and configuration of power cells for use in implantable devices, especially with regard to the size and shape thereof. Moreover, the power cells for the implantable devices must be highly reliable and be capable of providing an adequate amount of current and voltage for an extended period of time.

One type of power supply for use in an implantable device is an electrochemical cell. Examples include cells employing lithium as an anode material. Typically, within such cells, a metal foil anode coated with lithium is provided in combination with a cathode structure having a cathode material mounted on a current collector. The cathode material includes an active cathode compound, such as polycarbon monoflouride, bound to carbon by a single binder compound. A polymeric separator is positioned between the anode and the cathode material thereby forming an electrode structure. The electrode structure is mounted within a cell housing which is flooded with a liquid non-aqueous electrolyte. Appropriate electrical contacts are provided to the anode and cathode.

Within such electrochemical cells, the formation of the cathode material is particularly important. As noted, the cathode material includes an active cathode compound, carbon and a binder material. The binder material must adequately bind the active cathode compound both to the carbon of the cathode material and to the current collector on which the cathode material is mounted. Adequate binding must be achieved without unduly limiting or hindering the electrical characteristics of the active cathode compound. The binder must also achieve adequate mechanical coupling of the cathode material to the current collector such that the cathode material does not separate from the current collector during operation of the electrochemical cell. If an inadequate binder material is employed, the cathode material may peel away from the current collector during use of the electrochemical cell. Such is a particular problem for electrochemical cells used within implantable medical devices since the devices are subject to frequent movement after positioning within the human or animal which can dislodge the cathode material. As can be appreciated, any mechanical damage or degradation to the electrode structure could prevent operation of the electrochemical cell and thereby prevent operation of the medical device which, particularly in the case of cardiac pacemakers, may be fatal.

In many electrochemical cells separate binder and carbon compounds are not provided. Rather, high surface area carbon particles are used which not only provide the necessary carbon content for the cathode material but also act as a binder. The high surface area carbon powder is particularly useful within common alkaline batteries using magnesium dioxide, mercuric oxide or silver oxide as active cathode materials. Although effective in alkaline batteries which use a solid electrolyte, high surface area carbon powder is not effective in electrochemical cells employing liquid electrolytes, such as lithium cells, because the binder is dissolved by the liquid electrolyte.

Hence, for electrochemical cells employing a liquid electrolyte, another constraint on the choice of binder materials is that the binder must not degrade in the presence of the electrolyte solution. For electrochemical cells employing a liquid electrolyte, fluoropolymers, either in powder form or in suspensions, are commonly used as the binder compound. An example of a common binder material is a co-polymer, such as Tefzell®, which combines the good bonding properties of otherwise unstable materials with stable materials which alone do not provide adequate bonding. Tefzell®, in particular, combines Teflon® with stable polymers to provide a stable binding material. Teflon®, by itself, is not effective because metallic lithium within a lithium battery cell degrades the Teflon®.

One problem with cathode structures formed using conventional co-polymer binders is that the cathode structures cannot effectively be employed with foil current collectors because the co-polymers do not adequately adhere to flat metal surfaces. To achieve adequate adherence the cathode material usually must be formed into a slurry then spread onto the thin foil. To form a slurry, the binder materials must be dissolvable in a solvent. Polymers and co-polymers such as Teflon® and Tefzell® are not soluble in any solvents and therefore cannot effectively be employed to form a slurry.

Accordingly, use of cathodes employing copolymer binders has been limited to electrochemical cells employing expanded screen current collectors which have rough surfaces formed of a network of interlaced metal strands. The cathode structure is pressed against the expanded screen current collector such that the cathode material becomes intermeshed with the strands of the expanded screen.

Although electrochemical cells employing co-polymer binder materials in combination with expanded screen current collectors have been somewhat successful, many disadvantages remain. One significant disadvantage is that the expanded screen current collectors are more expensive to fabricate than simple foil current collectors. Typically, titanium, 446-stainless steel or other expensive metals are employed. Not only are such metals more expensive, but such metals are quite rigid and the resulting electrode structures therefore cannot easily be formed into desired configurations such as spiral wound configurations or the like. Indeed, when an electrode structure formed of one of such metals is wound into a spiral configuration for mounting within a cylindrical cell housing, damage to the electrode structure often occurs requiring that the electrode structure be discarded. Softer metals which can more effectively be bent into a spiral configuration do not typically have sufficient rigidity to properly hold the cathode material. Moreover, expanded screen current collectors, particularly ones made of soft metals, have considerably greater width than thin foil collectors and thereby consume valuable space within the electrochemical cell, which is a significant problem within electrochemical cells for use in implantable medical devices wherein the size of the cell must be kept to a minimum.

It would be desirable to provide improved binder materials which avoid or overcome the disadvantages described above and it is to that end that aspects of the invention are drawn.

SUMMARY OF THE INVENTION

In accordance with one aspect of the invention improved binder compounds are provided for use in binding active cathode compounds to form an electrode structure suitable for use within lithium electrochemical cells employing non-aqueous electrolytes, particularly cells employing thin foil current collectors. Other aspects of the invention relate to improved cathode structures and to improved electrochemical cells.

In one embodiment, a pair of binder materials are employed with the binder materials chosen to react with each other during processing to form an improved binder compound. In particular, acrylonitril resin and polyethylene oxide binder materials are dissolved in acetonitrile solvent to form a homogenous solution. The binder solution is mixed with carbon and an active cathode compound such as manganese dioxide, polycarbon monoflouride, cobalt oxide or nickel oxide to produce a slurry for spreading onto a metal foil current collector. It is believed that the pair of binder materials react with the carbon to achieve improved bonding. The slurry is spread onto the metal foil before a substantial portion of solvents within the slurry evaporate. The solvents are then allowed to evaporate while the slurry is in contact with the metal foil yielding improved mechanical and electrical coupling with the metal foil.

Alternatively, the slurry may be processed for use with an expanded screen current collector. The cathode material is heated to evaporate the solvents. The slurry is then spread onto a metal surface and allowed to dry, yielding a thin flexible film. The flexible film is then pressed onto the expanded screen current collector. The flexible film may alternatively be used with a metal foil current collector having a fairly rough surface. This is achieved by roughening the flexible film, perhaps with sandpaper, then pressing the film against the metal foil.

A resulting cathode structure, employing either a metal foil current collector or an expanded screen current collector, is employed with a polymeric separator, lithium anode and non-aqueous electrolyte solution to form an electrochemical cell for use within implantable medical devices.

By forming a cathode material as described, electrode structures may be effectively prepared which employ either thin foil current collector or expanded screen current collectors. The cathode material exhibits excellent electrical contact between the active cathode compound and the current collector yet resists degradation from the non-aqueous electrolyte and which further achieves excellent mechanical coupling with the current collector for preventing any mechanical damage.

As such, the general objective set forth above is achieved. Other objects and advantages of the invention will be apparent from the detailed description of. the invention set forth below.

DETAILED DESCRIPTION OF THE INVENTION

The invention relates to an improved method for fabricating a cathode structure for use within an electrochemical cell for providing power within an implantable device and to the improved cathode structure itself. The invention will be described primarily with reference to a lithium battery cell employing a non-aqueous electrolyte but principles of the invention are applicable to other electrochemical cells as well.

Figure 1:
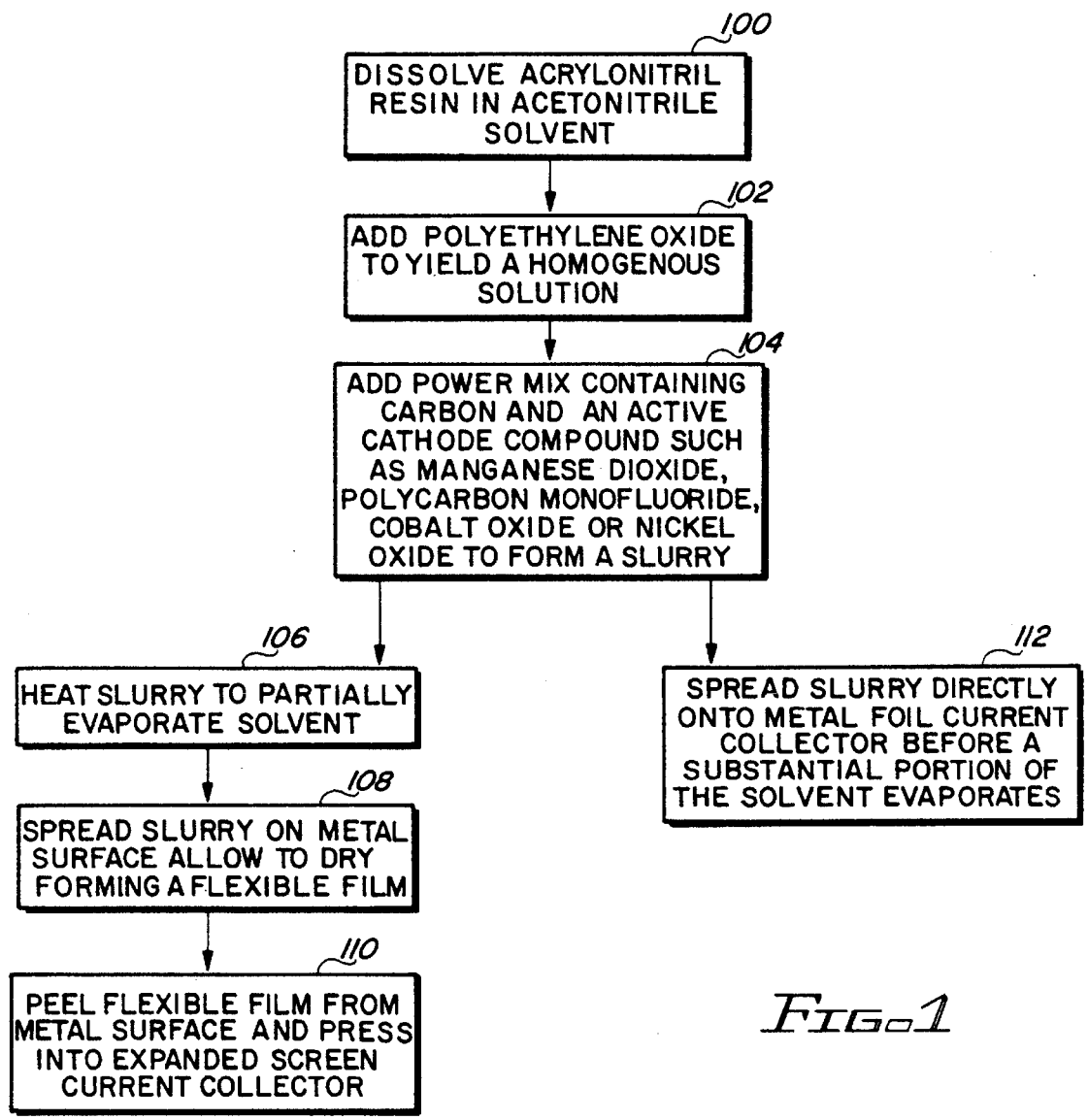
FIG. 1 illustrates a method for fabricating a cathode structure for use within an electrochemical cell of an implantable medical device.

FIG. 1 illustrates a method for fabricating a cathode structure. Initially, at 100, acrylonitril resin, sold under the trade name Acryloid resin, is dissolved in acetonitrile solvent. Polyethylene oxide powder is added to yield a homogenous solution, at 102. The polyethylene oxide powder is also soluble in the acetonitrile solvent. Next, at 104, a powder mix containing carbon and an active cathode compound such as manganese dioxide, polycarbon monoflouride, cobalt oxide or nickel oxide is added to form a slurry.

If a cathode material for use with an expanded screen current collector is desired, the slurry is placed on a gentle heating plate to evaporate most of the solvent and to assume a spreadable consistency, at 106. At 108, the slurry is spread on to a metal surface such as a smooth aluminum, titanium, nickel or stainless steel surface. The slurry dries in minutes leaving a solid flexible film which is peeled from the metal surface, then pressed onto the expanded screen current collector, at 110. The current collector may also be formed from various metals such as aluminum, titanium, nickel or stainless steel. Other metals may also be employed for use in steps 108 or 110 so long as the metals do not react with any of the compounds of the cathode material in a manner which might degrade the cathode material. If polycarbon monoflouride is employed within the cathode material, then nickel and nickel-containing metals such as conventional stainless steel should not be employed. If desired, 446-stainless steel may be employed, as such does not include any nickel. The use of aluminum as a current collector within electrochemical cells employing polycarbon monoflouride is described in co-pending U.S. patent application Ser. No. 08/459,684 (Marincic et al.), filed Jun. 2, 1995, entitled "Aluminum Current Collector For Electrochemical Cell Having A Solid Cathode", which is assigned to the assignee of the present application and is incorporated by reference herein.

If an electrode structure having a foil current collector is desired, then instead of performing method steps 106, 108 and 110 of FIG. 1, method step 112 is performed. More specifically, the slurry obtained at step 104 is spread directly on to the foil current collector without heating the slurry to evaporate the solvents. As such, the solvents evaporate after the slurry has been spread onto the foil current collector resulting in good electrical contact between the active cathode material and the current collector. As before, care should be taken in selecting the active cathode material and the current collector metal such that no undesirable reactions occur.

If aluminum, or another relatively rough metal, is employed as a metal foil current collector, the cathode material may be formed in the manner described in steps 106 and 108 to form a flexible sheet. The flexible sheet is then roughened, perhaps by using sandpaper, then positioned against the current collector. The metal may also be further roughened by using sandpaper prior to mounting the flexible film. The combination of the relatively rough metal surface and the roughened flexible cathode material ensures adequate mechanical and electrical coupling for most purposes. However, the step of spreading the slurry directly on the rough metal before evaporation of the solvents, as described above, may alternatively be employed.

The use of the two binding materials acrylonitril resin and poly ethylene oxide, yields a cathode material which has both excellent electrical characteristics and mechanical characteristics. It is believed that the two compounds react during processing to achieve an enhanced binding effect not available separately. Indeed, it has been found that the use of polyethylene oxide alone results in a cathode material which is too brittle to be effectively employed, particularly within electrode structures for use in cylindrical cells where the electrode structure is wound into a spiral. It has further been found that the use of acrylonitril resin alone results in a cathode material which is too "gluey" and cannot be as effectively used, particularly for expanded screen current collectors. Furthermore, because of the gluey texture of the cathode structure, the cathode material tends not to make as good a contact with the current collector as needed for a high pulse current of the cell. The combination of the two compounds yields a cathode material having the desired mechanical and electrical characteristics.

The cathode structures fabricated in accordance with the steps of FIG. 1 may be employed as a component of an electrode structure having a lithium anode and a polymeric separator.

Figure 2:
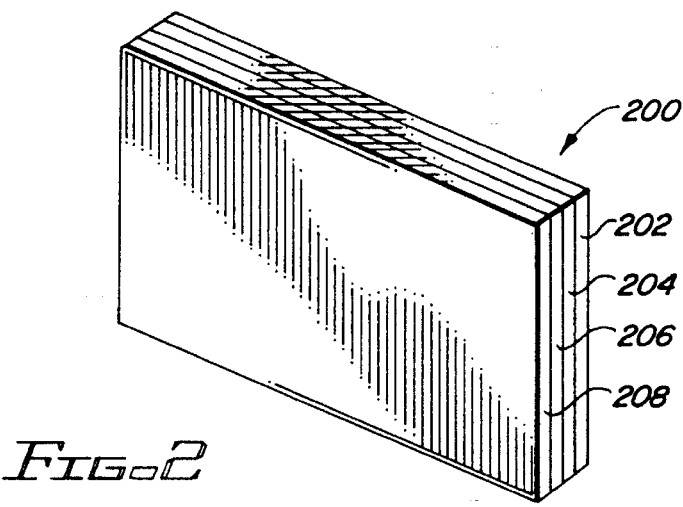
FIG. 2 is a perspective view of a portion of an electrode structure incorporating a cathode structure fabricated in accordance with the method of FIG. 1 employing a metal foil current collector.

An electrode structure of the type described employing a metal foil current collector is illustrated in FIG. 2. More specifically, FIG. 2 illustrates a portion of an electrode structure 200 having a thin foil current collector 202, a cathode material 204 fabricated as described, a polymeric separator 206 and a lithium-based anode 208. The anode 208 is mounted to one side surface of the polymeric separator 206. The cathode material 204 is mounted to the other side surface of the polymeric separator 206 with the current collector 202 facing away from the polymeric separator.

Figure 3:
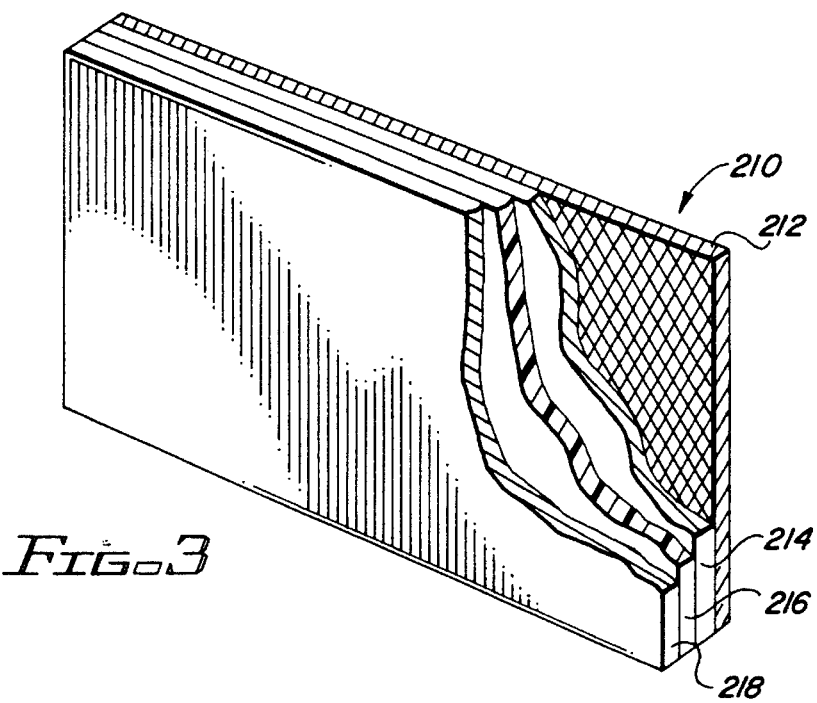
FIG. 3 is a perspective view, partially in cut-away, of another electrode structure also configured in accordance with the method of FIG. 1, but employing an expanded screen current collector.

FIG. 3 illustrates an electrode structure 210 employing an expanded screen current collector. The electrode structure 210 includes an expanded screen current collector 212 mounted to a flexible sheet cathode material 214 fabricated as described. The electrode structure 210 also includes a polymeric separator 216 and a lithium-based anode 218. As with the structure of FIG. 3, the anode 218 is mounted to one side surface of the polymeric separator 216 and the cathode material 214 is mounted to the other side surface. The current collector 212 faces away from the polymeric separator.

Figure 4:
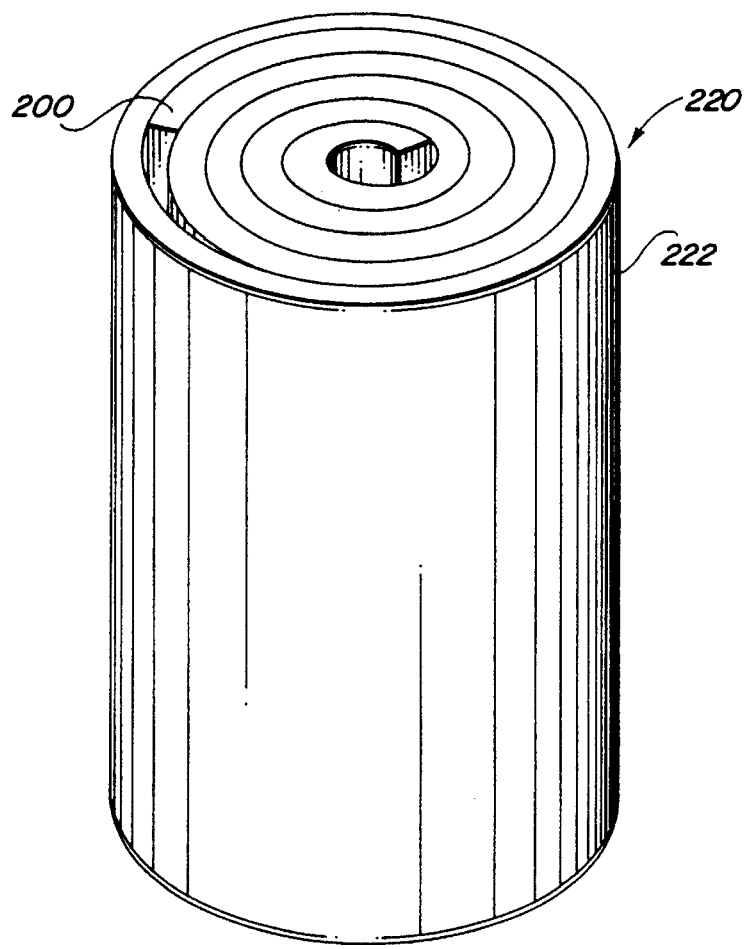
FIG. 4 is a perspective view of a cylindrical electrochemical cell employing a spiral wound electrode structure formed from the electrode structure illustrated in FIG. 2.

FIG. 4 illustrates an electrochemical cell 220 employing the electrode structure 200 illustrated in FIG. 2. The electrode structure 200 is spiral wound and mounted within a housing 222. Appropriate electrical contacts, not shown, are provided to the anode and cathodes of the electrode structure 200. The electrical contacts are connected to appropriate terminals, also not shown, on the exterior of the cell for interconnecting with electrical components of an implantable medical device. The cell housing 222 is flushed with a non-aqueous electrolyte and sealed prior to use.

EXAMPLE

In an exemplary implementation, the method of FIG. 1 was employed as follows. Six grams of acrylonitril resin (in a forty per cent solution) were dissolved in 300 cc's of the acetonitrile solvent. Six grams of polyethylene oxide powder were added to yield the homogenous solution. One hundred grams of powder mix containing carbon and an active cathode compound were added to the solution to yield a slurry.

The slurry was then spread to dry on the surface of a foil current collector. The resulting cathode structure was mounted to one side of a polypropylene separator and a lithium anode was mounted to the other side. The resulting electrode structure had the dimensions of 17×1.4×0.007". The electrode structure was wound into a spiral configuration and mounted within a cylindrical cell housing filled with a non-aqueous electrolyte. The cell was discharged to the constant load of 100 ohms. A discharge capacity was measured up to a cutoff voltage of 1.5 volts. The discharge capacity observed corresponded to 90% of a theoretical capacity predicted for the electrode, verifying the effectiveness of the overall electrochemical cell and the cathode material in particular.

What has been described are improved electrochemical cells including cathode structures and methods for making the cathode structures. One aspect of the improved cathode structures is the use of a pair of binder materials which react with carbon during processing of the cathode structure. In the specific exemplary embodiment described herein a combination of polyethylene oxide and acetonitrile resin is employed as the binders. Other combinations of binders may also be employed. In general, any combination of two or more binder materials which react during processing may be utilized. Of course, the two binder compounds must be soluble within the same solvent. In general, it is preferred that the two binder materials each be present in quantities between 2%–15% of the dry active cathode compound. Generally speaking, anything less than 2% will result in inadequate binding. Anything greater than 15% may result in inadequate electrical characteristics.

Although various specific and exemplary compound quantities are described above, alternative quantities may also be employed. Finally, although described with reference to an electrochemical cell employing lithium anode and a non-aqueous electrolyte solution, principles of the invention may be applicable to other electrochemical cells as well.

What is claimed is:

1. A method for preparing a cathode material for use in an electrochemical cell of an implantable device, the method comprising the steps of:

mixing a first binding material with a liquid solvent to produce a solution, wherein the first binding material is soluble in the solvent;

adding a second binding material to the solution, wherein the second binding material is also soluble in the solvent; and adding carbon and an active cathode compound to the solution forming a cathode material;

wherein the first and second binding materials are selected from a group of binding materials soluble in the solvent to react with each other.

2. The method of claim 1, wherein the first binding material is acrylonitril resin, the second binding material is poly ethyhylene oxide and the solvent is acetonitrile.

3. The method of claim 1, further comprising the step of forming a cathode structure by:

heating the cathode material until a portion of the solvent has evaporated and the cathode material achieves a spreadable consistency;

spreading the cathode material onto a metal surface until dry, yielding a flexible film; and mounting the flexible film to a current collector.

4. The method of claim 3, wherein the current collector is an expanded screen current collector.

5. The method of claim 1, further comprising the step of forming a cathode structure by:

spreading the cathode material onto a metal foil current collector before a substantial portion of the solvent within the cathode material evaporates; and allowing the solvent to evaporate from the cathode material while the cathode material is spread on the metal foil current collector.

6. The method according to claim 1, wherein the active cathode compound is selected from a group consisting of manganese dioxide, polycarbon monoflouride, cobalt oxide, and nickel oxide.

7. The method of claim 1, wherein the first and second binding materials are provide in quantities of 2 percent to 15 percent by weight of the active cathode compound.

8. A cathode material for use in an electrochemical cell of an implantable device, wherein the cathode material is prepared by performing the steps of:

mixing a first binding material with a liquid solvent to produce a solution, wherein the first binding material is soluble in the solvent;

adding a second binding material to the solution, wherein the second binding material is also soluble in the solvent; and adding carbon and an active cathode compound to the solution forming a cathode material;

wherein the first and second binding materials are selected from a group of binding materials soluble in the solvent to react with each other.

9. The cathode material of claim 8, wherein the first binding material is acrylonitril resin, the second binding material is poly ethyhylene oxide and the solvent is acetonitrile.

10. The cathode material of claim 8, prepared with the further steps of:

heating the cathode material until a portion of the solvent has evaporated and the cathode material achieves a spreadable consistency;

spreading the cathode material onto a metal surface until dry, yielding a flexible film; and mounting the flexible film to a current collector.

11. The cathode material of claim 9, wherein the current collector is an expanded screen current collector.

12. The method of claim 8, prepared with the further steps of:

spreading the cathode material onto a metal foil current collector before a substantial portion of the solvent within the cathode material evaporates; and allowing the solvent to evaporate from the cathode material while the cathode material is spread on the metal foil current collector.

13. The cathode structure of claim 8, wherein the active cathode compound is selected from a group consisting of manganese dioxide, polycarbon monoflouride, cobalt oxide, and nickel oxide.

14. The cathode material of claim 8, wherein the first and second binding materials are provide in quantities of 2 percent to 15 percent by weight of the active cathode compound.

15. An electrochemical cell for use in an implantable device, the electrochemical cell comprising:

an electrode structure comprising:
a cathode structure having a cathode material mounted on a metal current collector, the cathode material formed of acrylonitril resin and poly ethyhylene oxide, carbon and an active cathode compound,
an anode, and
a separator between the anode and the cathode;

a housing surrounding the electrode structure; and a non-aqueous electrolyte filling a portion of the housing.

16. The electrochemical cell of claim 14, wherein the current collector is an expanded screen current collector.

17. The electrochemical cell of claim 14, wherein the active material is selected from a group consisting of manganese dioxide, polycarbon monoflouride, cobalt oxide, and nickel oxide.

18. The electrochemical cell of claim 14, wherein the first and second binding materials are provide in quantities of 2 percent to 15 percent by weight of the active cathode compound.

19. The electrochemical cell of claim 14, wherein the anode comprises lithium.

* * * * *